Jan. 28, 1964 R. M. KROKOS 3,119,498
RACK
Filed Feb. 17, 1961 4 Sheets-Sheet 3
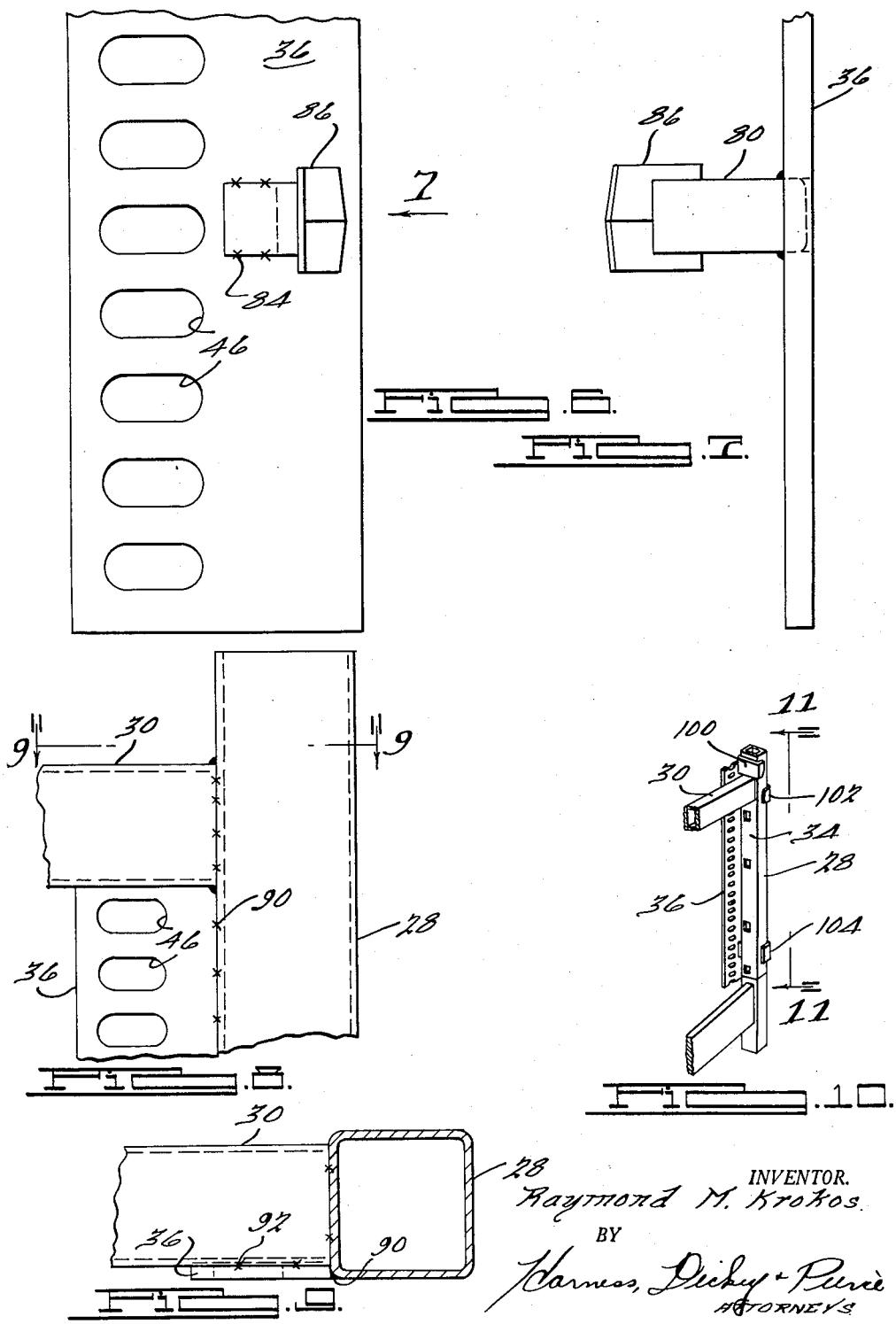
INVENTOR.
Raymond M. Krokos.
BY
Harness, Dickey & Pierce
ATTORNEYS

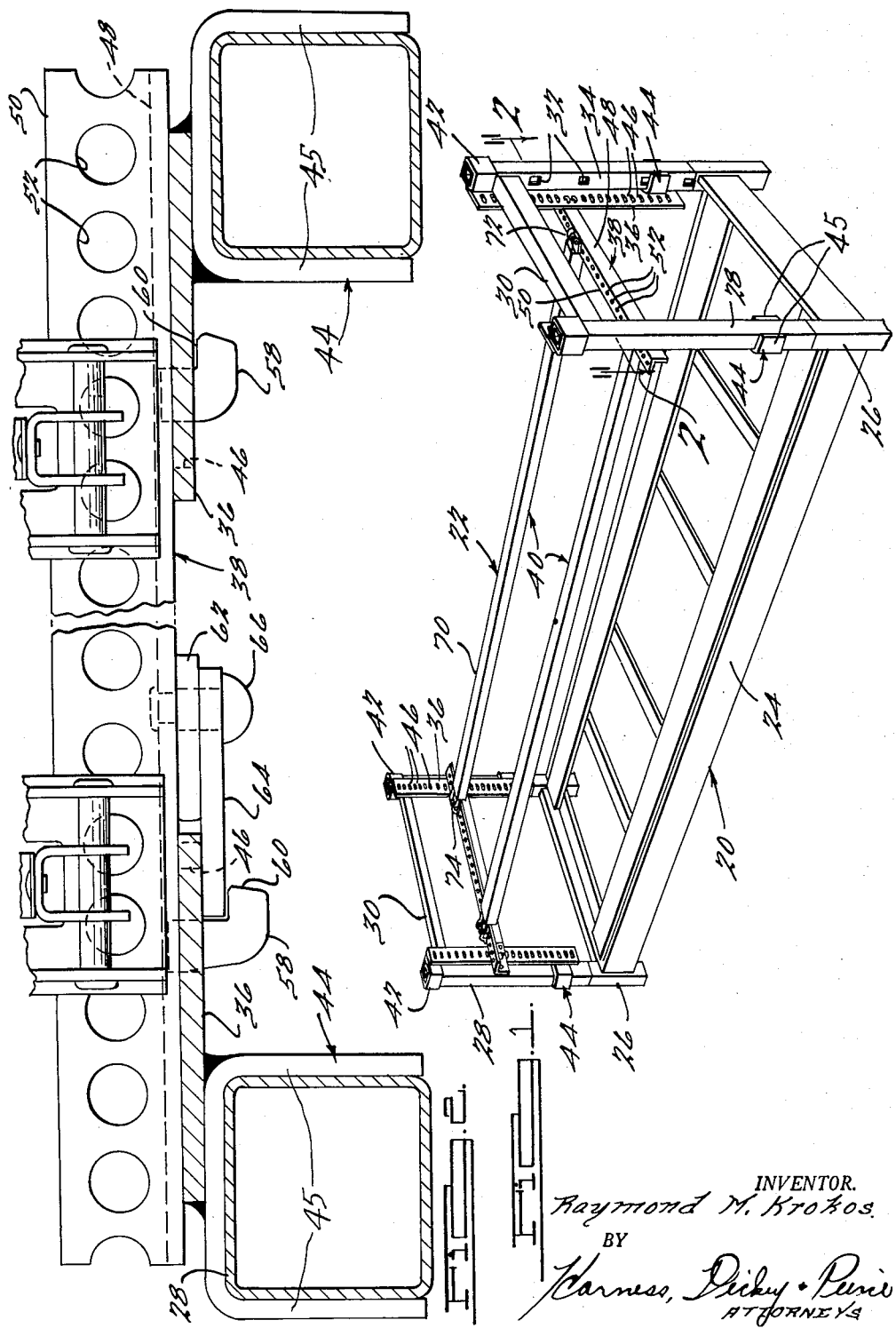

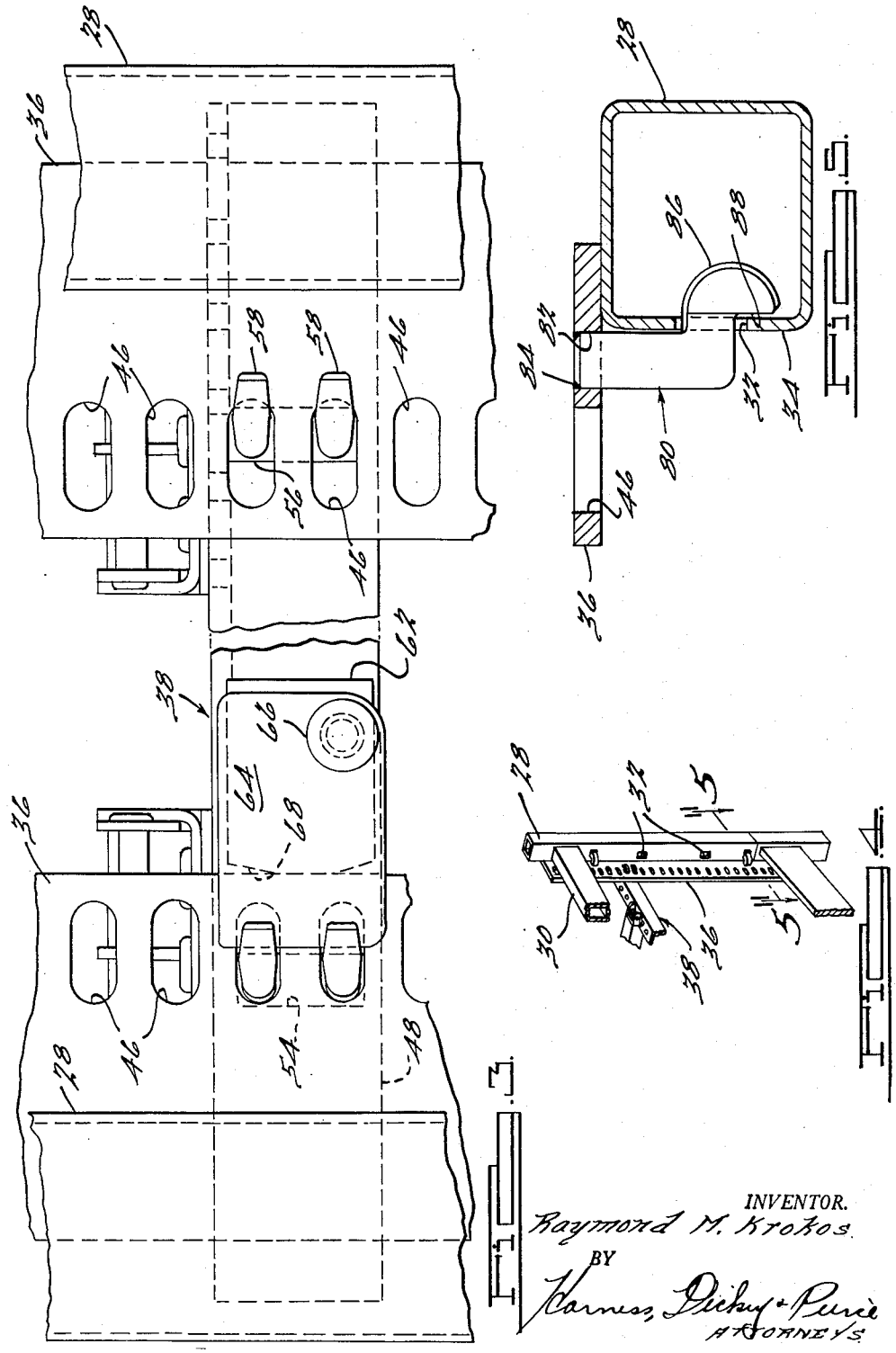

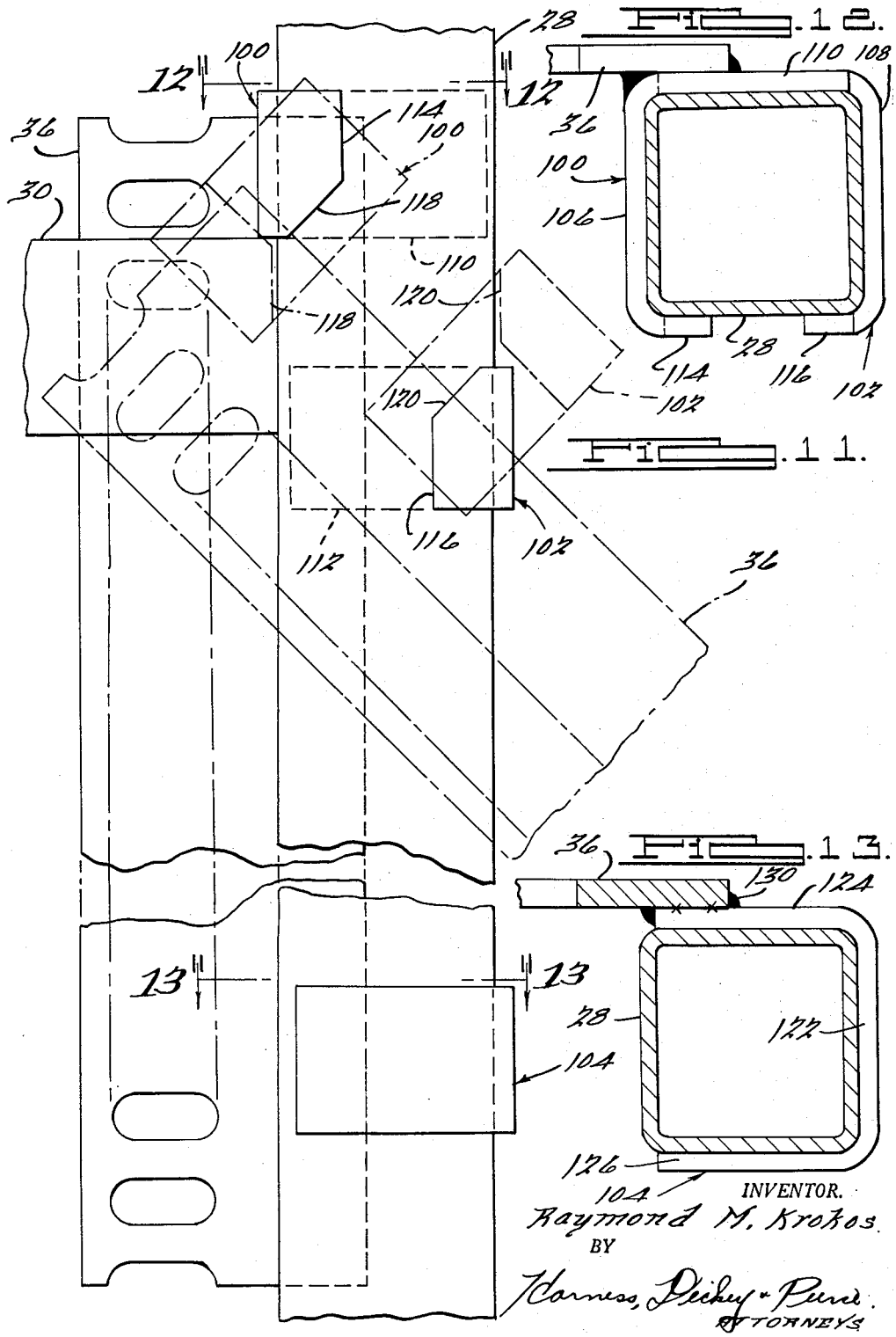

United States Patent Office 3,119,498
Patented Jan. 28, 1964

3,119,498
RACK
Raymond M. Krokos, Detroit, Mich., assignor to Evans Products Company, Plymouth, Mich., a corporation of Delaware
Filed Feb. 17, 1961, Ser. No. 90,039
6 Claims. (Cl. 211—182)

The present invention relates to racks of the type finding increasingly extensive use in industry for the storage and transportation of a wide variety of products and workpieces in various stages of completion.

It is an object of the present invention to provide an improved rack which is readily adjustable for receiving and holding loads of workpieces of widely differing shapes, sizes and numbers.

It is an object of the present invention to provide a portable industrial rack including improved means adjustable both vertically and horizontally for bracing loads received in the rack.

It is also an object to provide such an improved industrial rack including a standard, conventional, and commercially available industrial rack and improved, fully adjustable load bracing means which may be readily removed therefrom and attached thereto manually and without the use of tools.

Another object is to provide a conversion kit for an industrial rack enabling the rack to be readily adapted for supporting and carrying a wide variety of loads and which kit may be readily attached to the rack and fully adjusted without the use of tools.

Further, it is an object of the present invention to provide an improved industrial rack and rack conversion kit which are simple in design, reliable and durable in use, which facilitate economical and efficient use of rack space, which are economical of manufacture, and which are easily and readily adapted for use with a wide variety of loads.

Other and more detailed objects of the present invention will be readily apparent to those skilled in the art from a consideration of the following specification, the appended claims and the accompanying drawings, throughout the several views of which like reference characters designate like parts and wherein:

FIGURE 1 is a perspective view of a rack constructed in accordance with a preferred form of the present invention;

FIGURE 2 is a broken enlarged transverse sectional view of the structure illustrated in FIGURE 1 taken substantially along the line 2—2 thereof;

FIGURE 3 is a broken enlarged end elevational view of the structure illustrated in FIGURE 1;

FIGURE 4 is a broken perspective view of a rack embodying a modified construction;

FIGURE 5 is an enlarged transverse horizontal sectional view of the structure illustrated in FIGURE 4 taken substantially along the line 5—5 thereof;

FIGURE 6 is a broken enlarged elevational view of one of the end plates of the structure illustrated in FIGURES 4 and 5;

FIGURE 7 is an elevational view of the structure shown in FIGURE 6 looking in the direction of the arrow 7 thereof;

FIGURE 8 is a broken end elevational view of a rack of another modified construction;

FIGURE 9 is a transverse horizontal sectional view of the structure illustrated in FIGURE 8 taken substantially along the line 9—9 thereof;

FIGURE 10 is a broken perspective view of a rack of another modified construction;

FIGURE 11 is a broken enlarged end elevational view of the structure illustrated in FIGURE 10 taken substantially along the line 11—11 thereof, and showing in broken lines a position of the end plate during assembly thereof with the rack;

FIGURE 12 is a broken transverse, horizontal sectional view of the structure illustrated in FIGURE 11 taken substantially along the line 12—12 thereof; and, FIGURE 13 is a broken transverse horizontal sectional view of the structure illustrated in FIGURE 11 taken substantially along the line 13—13 thereof.

Referring to the drawings and particularly to FIGURES 1 to 3, inclusive, the improved rack there illustrated comprises a standard, conventional industrial rack generally designated 20 and a load bracing assembly popularly known as a rack conversion kit mounted thereon and generally designated 22. The rack 20 illustrated is a standard industrial rack of conventional construction and commercially available. It includes a rectangular base 24 having vertically extending corner post sockets 26 at its corners which telescopically receive the reduced lower ends of corner posts 28. The corner posts 28 at each end of the base 24 are interconnected, in spaced relation below their upper ends, by a horizontal frame member 30. Each of the corner posts 28 is provided with a plurality of rectangular apertures 32 spaced along the inner surface 34 thereof, that it, the surface facing the other corner post 28 at the same end of the base 24.

The load bracing assembly 22 comprises an end plate 36 mounted on each of the corner posts 28, a horizontal support member 38 at each end of the base 24, extending between and supported for adjustment vertically of the end plates 36, and load bracing or dunnage bars 40 extending between and supported on the members 38 for adjustment longitudinally thereof.

In the construction illustrated in FIGURES 1, 2 and 3 each end plate 36 is provided at its upper end with a rectangular loop 42 adapted to receive the upper end of one of the corner posts 28. At its lower end each plate 36 carries a U-shaped bracket 44 adapted to receive the corner post 28 between the spaced legs 45 of the bracket 44 as illustrated in FIGURE 1. The loop 42 and the bracket 44 are secured to the plate 36 in offset relation relative to the vertical centerline of the plate so that, when the loop 42 is received over the upper end portion of the corner post 28, as illustrated in FIGURE 1, the plate 36 extends parallel to the crossbar 30 interconnecting the corner posts at one end of the base 24, and is disposed with a substantial portion of the plate 36 extending inwardly beyond the inner surface 34 of the corner post. This inwardly extending portion of the plate 36 is provided with a plurality of uniformly spaced vertically arranged apertures 46 permitting adjustment of the horizontal support member 38 vertically of the plates 36. The plates 36 differ only in that at each end of the rack one end plate 36 might be referred to as "left-hand" and the other as "right-hand." It will be noted that with the plate 36 mounted on the corner post in the position illustrated, the vertical support for the plate 36 is provided by the engagement of the loop 42 at the inner side of the post 28 with the upper surface of the crossbar 30. It will thus be seen that the plate 36 is readily mounted on one of the corner posts 28 without the use of tools and by the simple operation of disposing it parallel to the post 28 with the loop 42 aligned with the upper end of the post 28 and with the legs of the bracket extending on opposite sides of the post 28. The plate 36 is then lowered until the loop 42 is moved over the upper end of the post 28 and into engagement with the crossbar 30. Similarly, the plate 36 may be readily removed from the rack 20 by raising it sufficiently to move the loop 42 off the upper end of the post 28.

The horizontal support member 38 illustrated in FIGURES 1 to 3, inclusive, is formed of a length of angle iron and extends between and is supported on the plates 36 at one end of the rack 20 in a generally horizontal position as illustrated in FIGURE 1, with one flange 48 thereof extending vertically and parallel to the adjacent faces of the plates 36 and with the other flange 50 thereof extending horizontally and provided with a plurality of apertures 52 uniformly and closely spaced longitudinally thereof. The support member 38 is supported on the plates 36 as best illustrated in FIGURES 2 and 3. The vertical flange 48 of the support member 38 is provided with a pair of rectangular apertures 54 each of which receives the base portion 56 supporting a pair of hooks 58 which extend rearwardly from the flange 48, that is, in a direction opposite to the flange 50. This hook base 56 in the construction illustrated is welded in place in the aperture 54. The hooks 58 at one end of the support member 38, the right-hand end as viewed in FIGURES 2 and 3, are adapted to extend through two adjacent ones of the apertures 46 in the plate 36 and have laterally extending end portions 60 adapted to overlie a portion of the plate 36 adjacent the apertures 46 when the supporting member 38 is in the assembled position illustrated.

The hooks 58 at the opposite or left-hand end of the support member 38, as viewed in FIGURES 2 and 3, are slightly longer than the hooks 58 and are also received through two adjacent ones of the apertures 46 in the plate 36 at the other corner post 28. They are held against withdrawal by a latch mechanism consisting of a pad 62 substantially equal in thickness to the end plate 36 and welded or otherwise suitably secured to the rear face of the flange 48 of the support member, and a latch plate 64 pivotally mounted on the outer face of the pad 62 by a rivet 66 extending through the latch 64, the pad 62, and the flange 48 of the support member 38. The pad 62, as best illustrated in FIGURE 3, is so disposed on the flange 48 that when the hooks 58 at the opposite or right-hand end of the support member 38 have been moved through the plate apertures 46 and the support member 38 moved to the position illustrated in FIGURES 2 and 3 so that the end portion 60 of the hooks 58 overlie the flange 48 adjacent the apertures 46, the pad 62 will be in position to engage the edge of the plate 36 upon which the left-hand end of the support member is mounted. It will thus be seen that this engagement of the pad with the adjacent edge of the plate 36 prevents longitudinal movement of the supporting member 38 in a direction to permit the hooks 58 at the right-hand end of the support member to be aligned with and withdrawn from the apertures 46. The latch plate 64 is held in position by the force of gravity and its left-hand edge portion, as illustrated in FIGURES 2 and 3, is received between the plate 36 and the laterally extending end portions 60 of the hooks 58, thus preventing withdrawal of the hooks 59 at the left-hand end of the support member 38 from the apertures 46 in which they are received and with which, it will be noted, they are aligned. It will be noted that the edge 68 of the pad 62, which is adapted to engage the edge of the plate 36, as above stated, is arcuately shaped. By virtue of this construction, the support member 38 may be mounted in a slightly out-of-horizontal position in the event that this is desired.

The workpieces or loads received in the racks are engaged and held in place by the bracing bars 40. These bracing bars 40 may be of the construction described and illustrated in greater detail in the co-pending application of Henry L. Dunlap, Serial No. 753,380, filed August 5, 1958, now U.S. Patent 3,029,746 granted April 17, 1962, also assigned to the assignee of the present application. It is sufficient for the present purposes to understand that the bars 40 include an elongated main body portion 70 adapted to engage the rod received in the rack and having end fittings 72 and 74 at opposite ends thereof adapted to attach the bars 40 to the horizontal flanges 50 of the supporting members 38. At least one of the end fittings 72 and 74 is connected to the body 70 for telescopic movement relative thereto and each of the end fittings includes pin means adapted to be received in the apertures 52 provided in the flange 50 of the support member 38 and latch means for holding the end fittings connected to the support members 38.

In a modified construction illustrated in FIGURES 4 through 7, inclusive, the construction is generally similar to that above described but differs with respect to the manner of mounting the end plates 36 on the corner posts 28. In the construction illustrated in FIGURES 4 to 7, inclusive, each of the end plates 36 is provided with a pair of vertically spaced supporting hooks 80, each of which has one end received in an aperture 82 provided in the plate 36 and welded to the plate 36 as indicated at 84. Each hook 80 extends at right angles to the plate 36, as best illustrated in FIGURES 5 and 7, and at its outer end has an enlarged offset head 86 adapted to be inserted through one of the apertures 32 in the inner surface 34 of a corner post 28. In the assembled position illustrated with the plate 36 engaging the corner post 28, as best illustrated in FIGURE 5, the head 86 has a nose surface 88 adapted to engage an inner surface of the post 28 adjacent the aperture 32 to hold the hook and plate in assembled relation to the post 28. Assembly of the plate 36 and hook 80 carried thereby with the post 28 is effected with the plate extending at right angles to the position illustrated in FIGURE 5 so that the head 86 can be readily moved into the aperture 32. The plate is then rotated in a clockwise direction toward the position there illustrated and during this movement the movement of the head 86 through the aperture 32 is completed and the plate 36 is moved into engagement with the corner post 28, and the nose surface 88 of the head 86 is moved into engagement with the inner surface of the post 28.

It will be appreciated that when a support member 38 is connected between the end plates 36 it holds the plates 36 against movement in a direction to permit withdrawal of the heads 86 from the apertures 32 and thus holds the plates 36 in assembled position with respect to the corner posts 28. It will be noted that in the construction illustrated in FIGURES 4 through 7, inclusive, the plates 36 are supported on the corner posts by the engagement of the hooks 80 in the apertures 32 rather than by engagement with the frame member 30 as in the above described embodiment.

FIGURES 8 and 9 illustrate that, if desired, the end plates 36 may be permanently installed by welding them to the corner posts and the crossbar 30. The weld to the corner posts 28 is indicated at 90 and that to the frame member 30 is indicated at 92.

FIGURES 10 through 13, inclusive, illustrate another construction which may be employed for supporting the end plates 36 on the rack 20. In this construction, as in the above described construction illustrated in FIGURES 1 to 3, inclusive, the vertical support for the plate 36 is provided by the frame member 30. In the construction of FIGURES 10 to 13, inclusive, the plate 36 is provided with three C-shaped brackets 100, 102 and 104. The brackets 100 and 102 are vertically spaced relative to each other and disposed adjacent the upper end of the plate 36 and the bracket 104 is disposed in spaced relation above the lower end of the plate 36. The upper brackets 100 and 102 are disposed, as best visualized from a consideration of FIGURE 10, with the upper bracket 100 disposed with its web portion 106 overlying the inner surface 34 of the corner post 28 and with the web portion 108 of the upper bracket 102 overlying the opposite side of the corner post 28. These upper brackets have long legs 110 and 112, respectively, which are welded to the end plate 36. These upper brackets also have short legs 114 and 116 parallel to the long legs 110 and 112, respectively, and spaced therefrom so that the corner post 28 may be received between the long and short legs of each of these brackets. To permit assembly of the end plate 36 and the brackets 100 and 102 carried thereby, with the corner post 28, the lower outer corner of the upper bracket 100 is relieved as indicated at 118 in FIGURE 11 and the upper outer corner of the short leg 116 of the bracket 102 is relieved as indicated at 120. It will be noted that these edges 118 and 120 are parallel and that the distance between them is such that the post 28 may be moved between these edges when the edges 118 and 120 are parallel to the post 28.

The lower bracket 104 is also disposed with its web 122 adapted to engage the same side of the post 28 engaged by the web 108 of the bracket 102. In the case of the bracket 104 the legs 124 and 126 are of equal length and adapted to receive the post 28 therebetween, the leg 124 being welded to the end plate 36 as indicated at 130 in FIGURE 13.

FIGURE 11 illustrates in broken lines the position of the end plate 36 as it is ready to be attached to the corner post 28, in which it will be seen that the edges 118 and 120 of the upper and lower brackets 100 and 102 are spaced to receive the corner post 28 therebetween. After the end plate 36 has been moved at right angles to the plane of the drawing as viewed in FIGURE 11, to move the corner post 28 between and past the edges 118 and 120, the plate 36 is then rotated in a clockwise direction from the position illustrated in broken lines to the position illustrated in full lines, thus moving the brackets 100 and 102 into engagement with the post 28 as shown in FIGURE 11 and in FIGURE 12 and moving the bracket 104 into engagement with the corner post 28 as shown in FIGURES 11 and 13. By reversing these movements, the end plate 36 may be readily removed from the corner post 28. It will be noted that when the end plate 36 is in the assembled position illustrated in full lines in FIGURE 11, the bracket 100 engages the upper surface of the frame member 30 connecting the corner posts 28 to provide the vertical support for the end plate 36.

In use of racks of the general type of the rack 20, it is common to stack them one on top of the other. It will be appreciated that when the racks are stacked in this way, end plates 36 of the construction illustrated in FIGURES 1 to 3 cannot be assembled with the corner posts 28 of the lower racks without removing the upper ones. However, it will be understood that end plates of the constructions illustrated in FIGURES 10 to 13, inclusive, and FIGURES 4 to 7, inclusive, can readily be applied to the corner posts of the lower racks without the necessity of removing any upper racks.

While only a fed specific embodiments of the present invention have been illustrated and described in detail herein, it will be readily appreciated by those skilled in the art that numerous modifications and changes may be made without departing from the spirit of the present invention.

I claim:

1. A conversion kit for a rack including a rectangular base and corner posts extending upwardly therefrom, said conversion kit comprising a plurality of elongated end plates individual to said corner posts and including means adapted to mount said end plates on said corner posts in parallel relation thereto, said end plates including a plurality of attaching means spaced longitudinally thereof, a pair of support members having a plurality of attaching means spaced longitudinally thereof and each adapted to be disposed at one end of said rack and extend between the end plates at said one end, each said support member having connecting means for selectively connecting it to the attaching means of the end plates at one end of said rack, and a plurality of load bracing bars adapted to extend between said support members and having end fittings for selectively connecting said bars to said attaching means of said support members, said first named means being so constructed and arranged that said end plates may be assembled with said corner posts from the sides of and without being moved over the ends of said posts, said posts having spaced apertures therein and said first named means including spaced hooks on said end plates adapted upon a predetermined movement of said plates relative to said posts to be moved into said apertures to mount said end plates on said posts, with support members upon connection to said end plates holding said end plates against the reverse of said predetermined movement and dismounting said end plates from said posts.

2. A rack including a rectangular base and corner posts extending upwardly therefrom, a plurality of elongated end plates individual to said corner posts and including means removably mounting said end plates on said corner posts in parallel relation thereto, said end plates including a plurality of attaching means spaced longitudinally thereof, a pair of support members having a plurality of attaching means spaced longitudinally thereof and each disposed at one end of said rack and extending between the end plates at said one end, each of said support members having connecting means selectively connecting it to the attaching means of the end plates at one end of said rack, a plurality of load bracing bars extending between said support members and having end fittings selectively connecting said bars to said attaching means of said support members, said first named means being so constructed and arranged that said end plates may be assembled with said corner posts from the sides of and without being moved over the ends of said posts, said posts having spaced apertures therein and said first named means including spaced hooks on said end plates which are moved into said apertures to mount said end plates on said posts by a predetermined movement of said plates relative to said posts, said support members when connected to said end plates, holding said end plates against the reverse of said predetermined movement and dismounting said end plates from said posts.

3. A conversion kit for a rack including a rectangular base and corner posts extending upwardly therefrom, said conversion kit comprising a plurality of elongated end plates individual to said corner posts and including means adapted to mount said end plates on said corner posts in parallel relation thereto, said end plates including a plurality of attaching means spaced longitudinally thereof, a pair of support members having a plurality of attaching means spaced longitudinally thereof and each adapted to be disposed at one end of said rack and extend between the end plates at said one end, each said support member having connecting means for selectively connecting it to the attaching means of the end plates at one end of said rack, and a plurality of load bracing bars adapted to extend between said support members and having end fittings for selectively connecting said bars to said attaching means of said support members, said first named means being so constructed and arranged that said end plates may be assembled with said corner posts from the sides of and without being moved over the ends of said posts by a predetermined movement of said end plates relative to said posts which is effective to mount said end plates on said posts, said support members upon connection to said end plates holding said end plates against the reverse of said predetermined movement to prevent dismounting of said end plates from said posts.

4. A rack including a rectangular base and corner posts extending upwardly therefrom, a plurality of elongated end plates individual to said corner posts and including means mounting said end plates on said corner posts in parallel relation thereto, said end plates including a plurality of attaching means spaced longitudinally thereof, a pair of support members having a plurality of attaching means spaced longitudinally thereof and each disposed at one end of said rack and extending between the end plates at one said end, each said support member having connecting means selectively connecting it to the attaching means of the end plates at one end of said rack, and a plurality of load bracing bars extending between said support members and having end fittings selectively connecting said bars into said attaching means of said support members, said first named means being so constructed and arranged that said end plates may be assembled with said corner posts from the sides of and without being moved over the ends of said posts by a predetermined movement of said end plates relative to said posts which is effective to mount said end plates on said posts, said support members when connected to said end plates holding said end plates against the reverse of said predetermined movement to prevent dismounting of said end plates from said posts.

5. A conversion kit having a rack including a rectangular base, corner posts extending upwardly therefrom and a frame member at each end of said rack interconnecting the posts thereat in spaced relation below the upper ends thereof, said conversion kit comprising a plurality of elongated end plates individual to said corner posts and including means adapted to mount said end plates on said corner posts in parallel relation thereto, said end plates including a plurality of attaching means spaced longitudinally thereof, a pair of support members having a plurality of attaching means spaced longitudinally thereof and each adapted to be disposed at one end of said rack and extend between the end plates at said one end, each said support member having connecting means for selectively connecting it to the attaching means of the end plates at one end of said rack, and a plurality of load bracing bars adapted to extend between said support members and having end fittings for selectively connecting said bars to said attaching means of said support members, said first named means being so constructed and arranged that said end plates may be assembled with said corner posts from the sides of and without being moved over the ends of said posts, said first named means including a pair of C-shaped brackets on each of said end plates adjacent one end thereof, said brackets having the legs adapted to be disposed at one side of one of said posts shaped to define parallel edges inclined relative to the length of the end plate and spaced to pass therebetween a portion of the post upwardly of said frame member whereby each of said end plates is adapted upon a predetermined movement of said plate relative to one of said posts to pass said portion of said post upwardly of said frame member between said inclined parallel edges and move one of said brackets into engagement with said frame member to mount said end plate on said post, said support members upon connection to said end plates holding said end plates against the reverse of said predetermined movement and dismounting said end plates from said posts.

6. A rack including a rectangular base and corner posts extending upwardly therefrom and a frame member at each end of said rack interconnecting the corner posts thereat in spaced relation below the upper ends thereof, a plurality of elongated end plates individual to said corner posts and including means mounting said end plates on said corner posts in parallel relation thereto, said end plates including a plurality of attaching means spaced longitudinally thereof, a pair of support members having a plurality of attaching means spaced longitudinally thereof and each disposed at one end of said rack and extending between the end plates at said one end, each said support member having connecting means selectively connecting it to the attaching means of the end plates at one end of said rack, and a plurality of load bearing bars extending between said support members and having end fittings selectively connecting said bars to said attaching means of said support members, said first named means being so constructed and arranged that said end plates may be assembled with said corner posts from the side of and without being moved over the ends of said posts, said first named means including a pair of C-shaped brackets on each of said end plates adjacent one end thereof, said brackets having the legs disposed at one side of one of said posts shaped to define parallel edges inclined relative to the length of the end plate and spaced to pass therebetween a portion of the post upwardly of said frame member whereby each of said end plates is adapted upon a predetermined movement of said plate relative to one of said posts to pass said portion of said post upwardly of said frame member between said inclined parallel edges and move one of said brackets into engagement with said frame member to mount said end plate on said post, said support members when connected to said end plates holding said end plates against the reverse of said predetermined movement and dismounting said end plates from said posts.

References Cited in the file of this patent
UNITED STATES PATENTS

| | | |
|---|---|---|
| 1,371,837 | Ard | Mar. 15, 1921 |
| 1,784,716 | West | Dec. 9, 1930 |
| 2,262,085 | Allen | Nov. 11, 1941 |
| 2,264,264 | Ferguson | Nov. 25, 1941 |
| 2,691,502 | Jones | Oct. 12, 1954 |
| 2,806,436 | Johnston | Sept. 17, 1957 |
| 2,808,788 | Stough | Oct. 8, 1957 |
| 2,901,987 | Campbell | Sept. 1, 1959 |